Oct. 7, 1930.   W. T. FERGUSON   1,777,300
SPRING COVER
Filed June 16, 1928
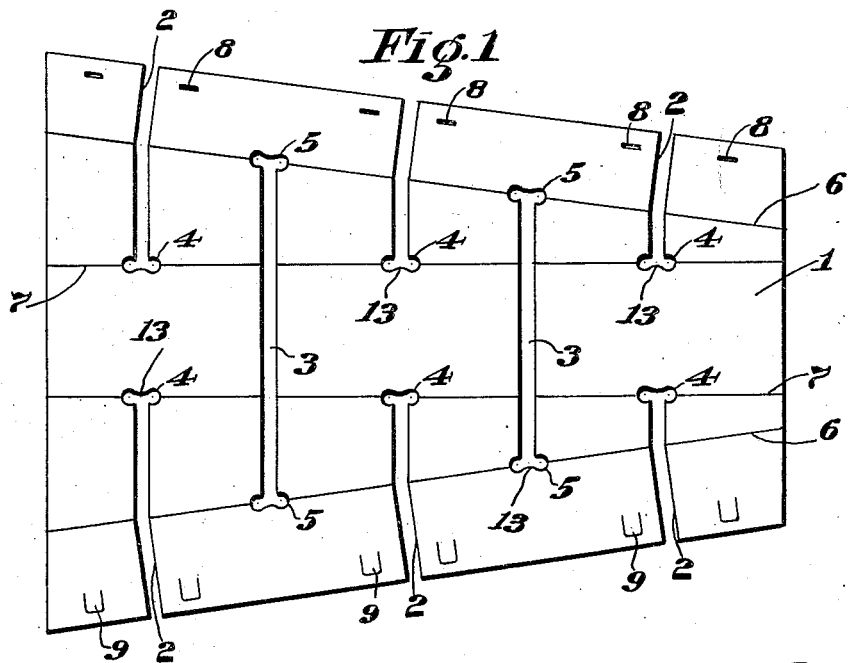
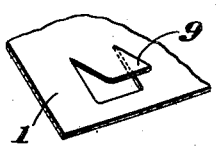
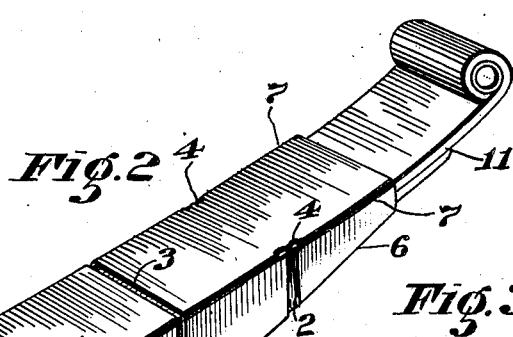
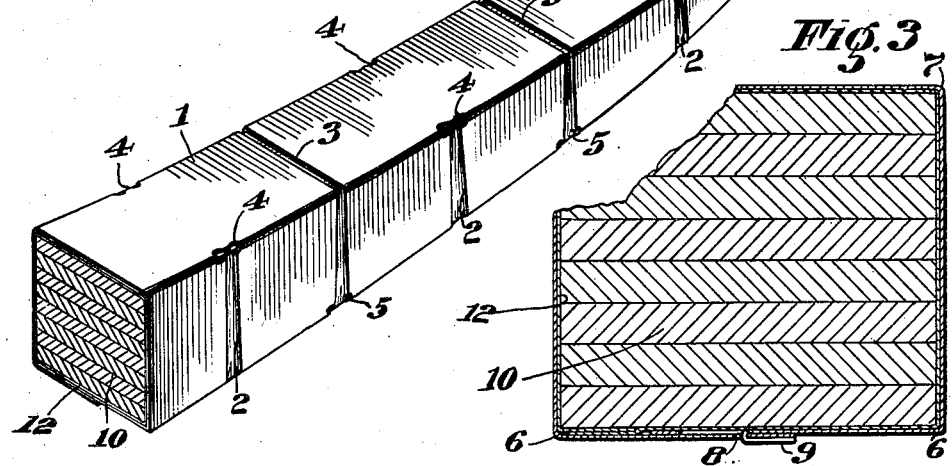
INVENTOR

Patented Oct. 7, 1930

1,777,300

UNITED STATES PATENT OFFICE

WARREN T. FERGUSON, OF BROOKLINE, MASSACHUSETTS

SPRING COVER

Application filed June 16, 1928. Serial No. 285,928.

The present invention has relation to the spring covers commonly used in connection with the laminated springs of automobiles and other vehicles, for the purpose of excluding dirt and water from the springs, and for retaining a supply of grease or other lubricant in close association with the several leaves thereof to keep the springs in efficient working condition.

The general object of this invention is to provide a novel and improved device of the class indicated, having advantages in general over prior constructions in respect of simplicity of construction, economy of manufacture, ease of installation, and durability; and, in particular, to afford a satisfactory cover made of sheet metal which shall make available the advantages of this material over the well-known covers of leather and other soft and flexible material. These latter flexible materials have been widely used in the past, but are so susceptible to wear and tear in use that their useful life is relatively short. The application of a jack to a spring covered with flexible material, as is frequently done when need arises for changing a tire on an automobile, is a prolific cause of cutting or tearing of the cover, with consequent loss of lubricant and admission of dirt and water.

Metal covers of many types have been contrived with the object of providing a more durable device but have not given entire satisfaction. Among the reasons for this may be mentioned the difficulties encountered in contriving an essentially tubular casing or cover of stiff material capable of permitting the free flexing of the enclosed spring, through ability to conform unresistingly to the changing shape of the spring, and avoidance of all cramping of the leaves. Accordingly a further object of the present invention contemplates a metal cover that avoids these disadvantages and yet is substantially grease-tight and water-tight, and so designed as not to break through fatigue of its component material under the constant flexing compelled by the spring when in action.

Another important object of the invention is to provide a one piece metal spring cover so constructed as to enable it to be shipped while flat and applied to all sides of the spring by the simple process of folding. An important feature of the construction is the provision of integral fastening means so that no loose parts or additional fastenings, such as clips or lacings, are required.

The invention comprises a cover for vehicle springs, having the novel construction and features which are described in the following specification and then particularly pointed out in the appended claims.

The preferred embodiment of the invention is shown in the accompanying drawings, in which:

Figure 1 is a plan view of the cover in flat condition;

Fig. 2 is a perspective view of a portion of a vehicle spring, with the cover in place thereon;

Fig. 3 is an end view on a larger scale of the cut-off end of the spring of Fig. 2, showing the cover in place thereon, the means for securing it in folded relation, and the grease-retaining inner liner; and Fig. 4 is a detail view on a larger scale of one of the tongues struck up to provide fastening means.

The device of the invention is formed from a single piece of sheet metal, or other suitable sheet material having the requisite characteristics of stiffness and resiliency and durability. It is cut in trapezoidal form producing a blank preferably symmetrical with respect to its longitudinal axis, of a length sufficient to cover substantially one-half of the length of a typical laminated vehicle spring from the yokes combining such spring with the axle or frame of a car out to a point in proximity to the end of the spring, for example just short of the end of the next longest leaf of the spring as shown in Fig. 2.

In the metal sheet or blank 1 there may be cut two forms of slits 2 and 3, each of generous width to promote flexibility when the cover is in use and to prevent pinching and cutting of an inner, grease retaining liner, itself of flexible material, during the flexing of the spring 10 to which the cover is applied. The slits indicated at 2, 2, 2 extend inward across the marginal portions of the sheet 1 from both lateral edges thereof, a given slit 2 entering at one lateral edge being opposite and aligned with a similar slit 2 entering from the other lateral edge. The inner ends of such paired slits are spaced apart a distance substantially equal to the width of the leaves of the spring to which the cover is to be applied. The termini of all the slits 2, 2, 2 entering from one lateral edge are disposed on a line 7 parallel to the longitudinal axis of the sheet and spaced from said axis by substantially half the width of the spring leaves; and the termini of the slits entering from the other lateral edge are similarly disposed on a second line 7. None of the slits 2, 2, 2 crosses said axis. When the sheet 1, so formed, is applied to the top of a spring 10 with its said axis aligned with that of the top leaf 11, and the marginal portions of the sheet are folded along the lines 7, 7 down alongside the vertical sides of the spring and then folded again along the lines 6, 6 to cause the lateral edges to overlap across the bottom of the spring, the slits 2, 2, 2 will extend to the top of the top leaf 11 of the spring and by reason of their paired alignment will be the equivalent of continuous slits extending from the top fold-line at one side of the spring, across three sides of the folded cover and to the top fold line at the other side of the spring. It will be obvious that this arrangement permits vertical flexing of the applied cover without buckling. The slits 2, 2, 2 are not straight but are deflected slightly at the lines 6, 6· defining the bottom fold-lines, so that while their inner portions are perpendicular to the axis of the blank their outer portions are perpendicular to the edges of the blank causing alignment each with its corresponding slit when folded under the spring.

To avoid undesired relative endwise movement of the end-portions of each section of the folded cover as defined between adjoining pairs of slits 2, 2, 2 relative to the enclosed spring as the spring curves and straightens within them during flexing, there may be provided a second series of slits of the form indicated at 3, 3, 3 lying wholly within the width of the sheet 1 and disposed transversely to the axis of the sheet. Each slit 3 has its opposite termini on the bottom fold-lines 6, 6 so that it extends across the top and both vertical sides of the spring when the cover is applied as stated. Each slit 3 allows the sections referred to as defined between adjoining pairs of slits 2, 2, 2 to bend in the middle and conform more closely and easily to the curvature of the flexing spring, and thus materially reduce the flexing required of the material of the cover remaining uncut between the opposite termini of a pair of slits 2, 2. In other words, the flexing of each section occurs at three points, one of which lies at the upper side of the cover, instead of at two, and is lessened in degree, with corresponding postponement of fatigue of the metal in flexing. Further, the extent of opening and closing of each slit 2 or 3 for a given spring flexure is reduced, with a like reduction of chance of pinching and cutting a grease-retaining and water-excluding inner liner 12 where it may bulge out slightly into the slits 2, 3 if formed of material that is sufficiently flexible. Further, the tendency of the aforesaid sections to cramp the spring's action through pressing the leaves more tightly against each other as the spring curves in flexing is diminished or obviated.

It will be noted that each slit 2 and 3 terminates in an aperture or cut-out portion 4 and 5, respectively, communicating with the slit which is of greater width than its slit and offset with respect to the latter's direction of extent. These terminal apertures or offsets lie in and have their greatest width in the direction of extent of the several fold-lines 6 and 7 and as one of their functions serve to define lines of lessened rigidity of the metal on which the sheet will tend to bend when being folded about the spring. Thus they help the sheet 1 to fold on the desired fold-lines 6 and 7.

A second function of said apertures or offsets 4 and 5 is to broaden the zone over which occurs the flexing of the uncut metal, extending transversely across the cover from the inner end of a slit 2 to the inner end of its corresponding slit 2 in a pair, or from the ends of a slit 3 to the folded-under lateral edges. The said apertures 4 and 5 are preferably shaped to present, in line with the respective slits, a convex contour of the uncut metal bounding said apertures as indicated at 13, 13, 13. This convex contour prevents the flexing of the uncut metal from occurring wholly on a line joining the extremities of a given slit 3, or the opposing extremities of a pair of slits 2, 2 but spreads out the flexing over a band of a width about equal to the longitudinal extent of the said apertures or offsets. This greatly reduces the strain on any given unit of area of the metal incident to the constant flexing of the spring in use and consequently greatly postpones fatigue of the metal and subsequent breakage. The contour of the uncut metal bounding the apertures 4 and 5 need not necessarily be made convex at the point opposite the slits, but it should be other than concave to avoid the concentration of flexing upon a narrow line incident to the use of such a concave terminus for the slits.

For special purposes it may be desirable, and it is within the scope of the invention, to apply two of the slitted sheet metal covers to the same spring in superposed relation, with or without the use of the inner liner 12, in which event they will be related so that the slits of the under one are out of register with those of the outer one.

Any desired or preferred means of holding the cover in folded relation about the spring may be adopted. A simple means comprises tongues 9, 9, 9 struck up from the metal along one marginal portion and adapted to be entered in corresponding eyes 8, 8, 8 in the opposite marginal portion and then folded over to retain the two portions in overlapping relation, as shown in Fig. 3.

The grease-retaining inner liner 12, which preferably will be of material such as leather or heavy fabric, but which may be in part or in whole of flexible sheet metal, may be attached to one marginal portion of the cover at several points to facilitate application of the cover and liner as a unit to the heavily-greased spring. It will be understood that the usual heavy felt grease absorber may be used within the liner 12 if desired.

It is to be noted that the device of the invention itself serves to hold the several leaves of the spring in place, doing away with the need for the usual alignment and rebound clips. Consequently the problem of applying these clips over the cover, or of fitting the cover over the clips with attendant wearing of the cover thereby, does not arise.

The invention provides a simple and durable spring cover which may be rapidly produced from a single piece of inexpensive material at a single operation, may be shipped flat, may be quickly and easily applied, will efficiently perform its function with a minimum of likelihood of injury, and will permit unhampered action of the spring.

The material I prefer to use is sheet metal which has qualities and characteristics especially suited to use for spring covers, but it is recognized that other materials may be found that have substantially similar qualities and characteristics and these are included within the meaning of "metal" as used in this specification.

While I have illustrated and described only one form of my invention, I am aware that many alternative embodiments and equivalent forms of the present device may be contrived by a person skilled in the art without departing from the scope of my invention as defined by the following claims.

What I claim as new, is:—

1. A one-piece spring cover comprising a sheet of metal shaped to fit a spring and to be folded about all four sides thereof, said sheet being weakened throughout a series of transverse areas lying alternately in the top and bottom material of the cover, by virtue of which the cover will flex longitudinally with longitudinal flexing of an enclosed spring.

2. A one-piece spring cover comprising a sheet of metal shaped to fit a spring and to be folded about all four sides thereof, said sheet being weakened throughout a series of transverse areas lying alternately in the top and bottom material of the cover, and each such area extending also throughout the side material of the cover, by virtue of which the cover will flex longitudinally with longitudinal flexing of an enclosed spring.

3. A one-piece spring cover comprising a sheet of metal shaped to fit the spring and to be folded about all four sides thereof, said sheet being weakened by a series of slits in the material lying transversely of the spring, said slits all having portions thereof in the side material of the cover but only alternate slits having portions thereof in the top or in the bottom material of the cover.

4. A one-piece spring cover comprising a sheet of metal shaped to fit the spring and to be folded about all four sides thereof, said sheet being weakened by a series of transverse slits each of which has end portions in the side material of the cover forming pairs of slits parallel to and opposite each other, alternate pairs having their upper ends connected by a slit in the top material of the cover, and the remaining pairs having their lower ends connected by a slit in the bottom material of the cover.

5. A one-piece metal spring cover adapted to be folded about all four sides of the spring, having transverse slits to permit longitudinal flexing when folded, and having integral interlocking tongue and ear means for securing it in folded position on the spring.

6. A blank for a spring cover comprising sheet metal adapted to be folded about a spring to enclose the top, sides, and bottom thereof, having slits formed to extend from the lateral edges of the sheet across the bottom and the sides thereof, and other slits within the width of the sheet formed to extend across the top and the sides thereof as produced by folding.

7. A blank for a spring cover comprising sheet metal adapted to be folded about a spring and having one series of slits extending across a line of foldage inward from its lateral edges terminating substantially at another line of foldage short of its longitudinal axis, and another series of slits crossing said axis and the second named line of foldage and terminating short of said lateral edges substantially at the first named line of foldage.

8. A spring cover comprising sheet metal proportioned to enable it to be applied to the top of a spring and be folded down alongside the spring at both sides of the latter, and its marginal portions to be folded against the underside of the spring, said sheet having a series of slits in its marginal portions extending from the top fold-lines to the edges and another series of slits in its body-portion extending from one bottom fold-line to the other.

9. A spring cover comprising sheet metal adapted to be folded about a spring and having transverse slits formed therein to permit flexing of the folded cover, each slit having at its terminus within the sheet on substantially a line of fold an offset lying in the direction of said line of fold.

10. A cover for vehicle springs comprising sheet metal adapted to be folded about a spring and having transverse slits formed therein to permit flexing of the folded cover, the said slits respectively terminating within the sheet on substantially a line of fold in a cut-out portion disposed lengthwise of the sheet and across said terminal end of the slit.

11. A cover for vehicle springs comprising sheet metal adapted to be folded about a spring and having slits formed therein to permit flexing of the folded cover, the slits terminating within the sheet in apertures presenting a convex contour of the uncut sheet metal across the ends of the slits.

12. In combination with a vehicle spring, a grease-retaining member, and a sheet metal cover having its body portion folded over the top and sides of said spring and its marginal portions folded against the underside of the spring, the said folded cover having slits extending through its lateral edges across the bottom of said spring and terminating at the top fold-lines, and other slits within the body portion of the sheet extending from one bottom fold-line to the other thereof across the top of said spring.

In testimony whereof I affix my signature.

WARREN T. FERGUSON.